(12) United States Patent
Bordini (10) Patent No.: US 7,264,079 B2
(45) Date of Patent: Sep. 4, 2007

(54) STEERABLE REAR TRACTOR SUSPENSION (75) Inventor: Giorgio Bordini, Tenerife Canarias (ES)

(73) Assignee: CNH America LLC, New Holland, PA (US)

( * ) Notice: Subject to any disclaimer, the term of this patent is extended or adjusted under 35 U.S.C. 154(b) by 291 days.

(21) Appl. No.: 11/051,438

(22) Filed: Feb. 4, 2005

(65) Prior Publication Data

US 2006/0027411 A1 Feb. 9, 2006

Related U.S. Application Data (63) Continuation-in-part of application No. 10/911,888, filed on Aug. 5, 2004, now Pat. No. 7,204,340.

(51) Int. Cl.
*B60K 17/30* (2006.01)

(52) U.S. Cl. .................. 180/253; 180/408; 180/348; 180/359; 180/360; 180/361; 180/363; 180/372; 280/124.153; 280/124.156

(58) Field of Classification Search ............... 180/342, 180/343, 348, 349, 353, 355, 356, 359, 360, 180/361, 363, 372, 253, 408; 280/6.154, 280/124.153, 124.156
See application file for complete search history.

(56) References Cited

U.S. PATENT DOCUMENTS

| | | | | |
|---|---|---|---|---|
| 1,291,816 | A | * | 1/1919 | Fielder ..................... 180/356 |
| 1,354,462 | A | * | 10/1920 | Burrows ..................... 180/356 |
| 1,370,378 | A | * | 3/1921 | Starr ......................... 475/269 |
| 3,157,239 | A | * | 11/1964 | Bernotas ..................... 180/235 |
| 4,053,171 | A | | 10/1977 | Hyler |
| 4,614,247 | A | | 9/1986 | Sullivan |
| 5,024,636 | A | * | 6/1991 | Phebus et al. .............. 475/141 |
| 5,404,958 | A | | 4/1995 | Weiss |
| 5,538,264 | A | | 7/1996 | Brown et al. |
| 6,042,131 | A | | 3/2000 | Bailey |
| 6,491,129 | B1 | | 12/2002 | Young et al. |
| 6,502,840 | B1 | | 1/2003 | Leyonhjelm et al. |
| 6,722,994 | B2 | | 4/2004 | Woods et al. |
| 2002/0175486 | A1 | | 11/2002 | Young et al. |
| 2003/0047892 | A1 | | 3/2003 | Goddard |

* cited by examiner

*Primary Examiner*—Paul N. Dickson
*Assistant Examiner*—Tiffany L. Webb
(74) *Attorney, Agent, or Firm*—John William Stader; Michael G. Harms (57) ABSTRACT

A steerable rear suspension for a tractor includes a chassis comprising a front end, a rear end, a left side and a right side; an engine mounted on the chassis; a pair of steerable front wheels coupled to the front end, left and right side of the chassis; a left rear suspension including a left rear suspension arm pivotally coupled to the chassis at a leading end of the suspension arm, and a first steerable planetary gear system mounted on a trailing end of the suspension arm; a right rear suspension including a right rear suspension arm pivotally coupled to the chassis at a leading end of the suspension arm, and a second steerable planetary gear system mounted on a trailing end at the right suspension arm; and left and right rear wheels driven by the first and second planetary gear systems.

10 Claims, 6 Drawing Sheets

STEERABLE REAR TRACTOR SUSPENSION

CROSS-REFERENCE TO RELATED APPLICATIONS

This application is a continuation-in-part of U.S. patent application Ser. No. 10/911,888, filed Aug. 5, 2004 now U.S. Pat. No. 7,204,340.

FIELD OF THE INVENTION

The present invention relates generally to suspensions. More particularly, it relates to tractor suspensions, and even more particularly to steerable rear suspensions for agricultural tractors.

BACKGROUND OF THE INVENTION

Agricultural tractors have traditionally been unsprung. From their earliest beginnings in the late 1800's they have been supported on fixed axles extending from the chassis.

Originally, tractors were used as stationary engines. Located in a fixed position in a field, farmers would gather crops to be threshed and bring them in wagonloads to the tractor and a belt-driven threshing machine. In these early days, the ability to move fast was not important.

Tractors were gradually modified to tow implements such as plows, rakes, harrows, planters, and manure spreaders through agricultural fields. These mobile tractors did not need a great deal of speed since they replaced horses or oxen and needed only enough power to tow implements at horse or ox speed.

As time passed, engineers designed ever larger and stronger implements. To tow these implements, tractors were also made stronger and larger, with ten to fifty times the horsepower of the early tractors.

Eventually, agricultural tractors were capable of towing implements at higher speeds through agricultural fields. To accommodate these greater speeds, manufacturers began to develop front suspensions with springing and shock absorbing capability. These front suspensions were configured to pivot, permitting the front wheels of the tractor to keep a good grip on the ground as the terrain changed. As of today, however, no major manufacturer of tractors sells a commercially accepted agricultural tractor with a sprung rear suspension.

A primary reason that tractors with sprung rear suspensions have not been manufactured is due to the reaction forces that arise when a load is placed on the tractor. Traditional agricultural tractors have large rear wheels, typically on the order of approximately 1 to 2.2 meters in diameter. The large rear wheels apply high force to the ground, especially when a ground-engaging implement is ripping furrows through the ground 2 to 18 inches deep. The ground, in turn, applies an equally high (but in the opposite direction) reaction force on the frame of the tractor, and the reaction force can generate a moment great enough to literally lift the front wheels of a tractor without a rear suspension a meter or more off of the ground.

The existence of a moment large enough to lift the front wheels is best illustrated with reference to FIG. 6, which schematically shows a tractor 700 without a front or rear suspension towing an implement 148. An implement, resultant-force vector 402 is applied to the implement by the ground as the implement is pulled through the ground by the tractor 700. Implement force vector 402 can be broken down into two force vectors 404, 406 that represent the horizontal force (vector 404) acting to drag on the implement during forward motion, and the vertical force (vector 406) that pulls downward on the implement.

The implement is rigidly coupled to the tractor typically through a three-point hitch. The three-point hitch couples the implement to the tractor frame via a lower point A and an upper point B. The implement force vector 402 applies draft forces on the tractor that can be separated into horizontal and vertical forces $F_{Ax}$ and $F_{Ay}$ acting through the lower link 902 (i.e., at point A) and horizontal and vertical forces $F_{Bx}$ and $F_{By}$ acting through the upper link 904 (i.e., at point B). As one of ordinary skill will appreciate, the relative magnitudes of the component draft forces $F_{Ax}$, $F_{Ay}$, $F_{Bx}$ and $F_{By}$ depend upon the geometry of the three-point pitch.

Other forces acting on the tractor 700 include weight (depicted in the drawing as mg), which acts on the center of gravity $C_G$. In response to the weight, the ground applies forces $F_f$ and $F_r$ to the tractor through the front and rear axles, respectively.

Figure 6:
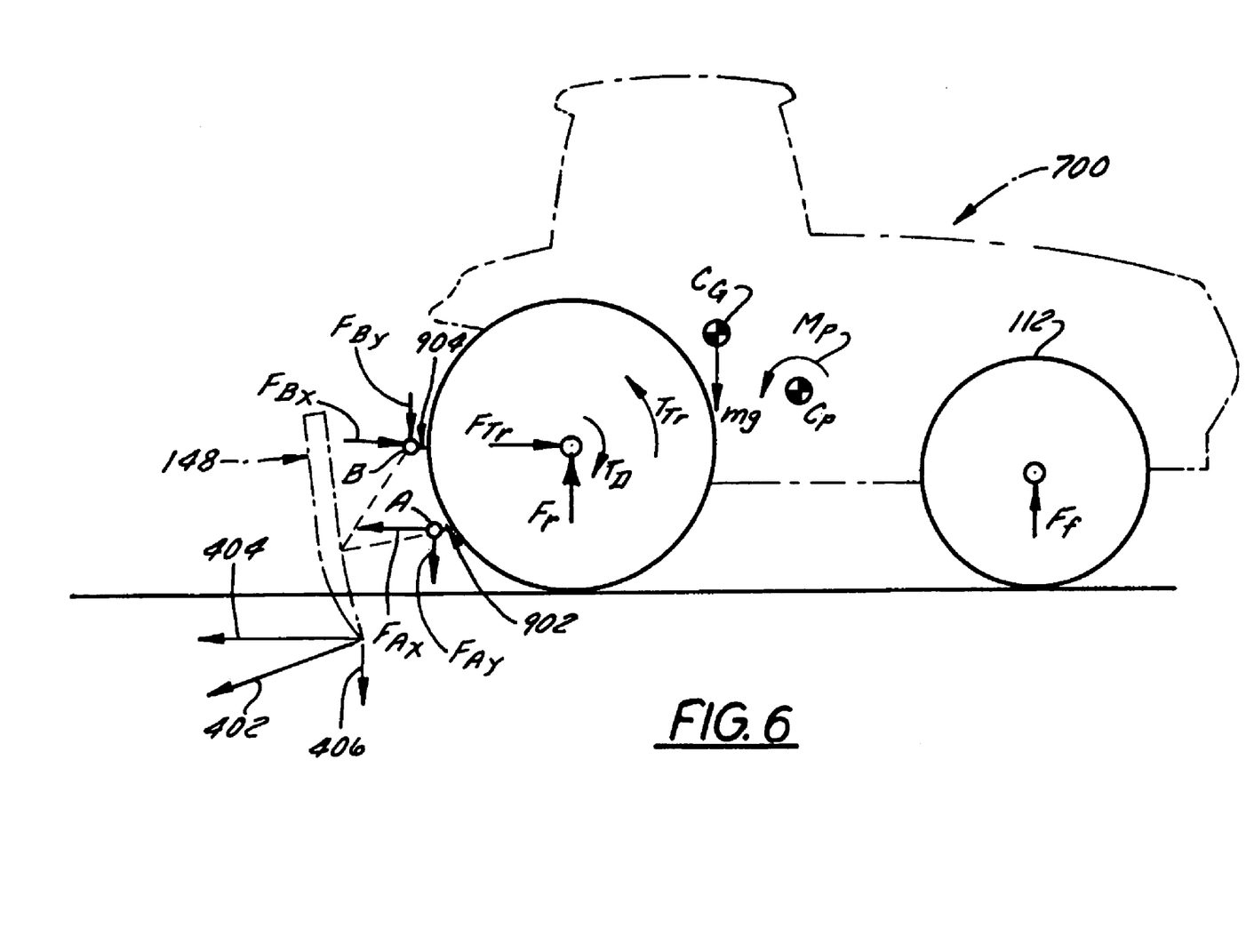
FIG. 6 is a schematic diagram showing the forces applied on the tractor by a towed implement.

There are torques shown in FIG. 6 as well. Drive torque $T_D$ is the torque applied by the engine (not shown in FIG. 6) to the axle (also not shown) to drive the rear wheels. When the tractor is being driven forward, the drive torque is clockwise. The rear wheels, as they are being driven, apply a force on the ground, and the ground, in turn, applies an equal and opposite traction force $F_{Tr}$ on the wheels that is applied to the tractor frame. The traction force of course is responsible for forward movement of the tractor.

Drive torque $T_D$ also generates a reaction torque (that is, traction torque $T_{Tr}$) that acts on the frame of the tractor. The traction torque is proportional to the traction force $F_{Tr}$ and is counterclockwise.

The forces and torques generate moments about a point on the tractor that tend to rotate the tractor about that point. For convenience, the point will be called the center of pitch $C_p$. Its location depends upon a number factors one of ordinary skill will appreciate. While the forces and torques may generate moments that cancel each other out to some extent, the net effect of all of the moments is to generate a counterclockwise moment $M_p$ about the center of pitch when the implement force vector 402 increases. The implement force vector increases when the implement 148 hits a stone, compacted soil, or some other such condition. As previously mentioned, the increased implement force vector can be large enough to cause a moment $M_p$ about the center of pitch that is itself large enough to lift the front tires and increase the load on the rear tires.

If the rear wheels were suspended on the frame rather than being fixed, the moment $M_p$ will not at first lift the front wheels, but it will tend to cause the rear suspension to squat. Such squatting can be disconcerting to the operator and can also wreak havoc on implement depth-control systems, which typically require a constant relationship between the tractor-frame and implement-frame heights.

One of ordinary skill will appreciate that some suspension configurations will cause the tractor to rotate clockwise (rather than counterclockwise, as has been described) when the tractor is subjected to increased loads. However, for the purposes of this discussion, we will consider the more intuitive case where the tractor rotates counterclockwise in response to increased loads. Nevertheless, the basic principles (and the problems with conventional systems) described herein are the same. Moreover, the principle of operation of the preferred embodiments (which will be described below) is the same regardless of whether the suspension tends to squat or sit up.

The suspension arrangement of the present invention generates a reaction torque on the vehicle to reduce the moment $M_P$ about the center of pitch. In other words, when the tractor pulls harder on its implement, the suspension in accordance with the present invention generates an increased counteracting, or reaction, force that matches or is proportional to the increased, horizontal force vector 404. Similarly, when the tractor pulls more gently on its implement, the suspension in accordance with the present invention generates a decreased force that matches the decreased horizontal force vector 404.

The applicant, in his co-pending patent application U.S. patent application Ser. No. 10/911,888, described a tractor that would solve many of these problems.

One problem that was not addressed by the tractor of that application was the ability to steer the rear suspension. The tractor shown in the prior application had a traditional steerable front suspension and had rear wheels that were suspended, but were not steerable with respect to the chassis of the vehicle. The rear suspensions, as best shown in FIGS. 2-3 of that application, included a trailing link suspension arm pivotally coupled to the chassis of the tractor at its front and free to pivot up and down at its rear end. The rear of the suspension arms included a planetary gear system from which a laterally extending axle protruded. The tractor's rear wheels were coupled to the ends of these axles.

The unique configuration of the rear suspension with the planetary gearboxes provided in the parent application is also provided herein. The present rear suspension has the same suspension arm configuration and the same planetary gear system that automatically counteracts forces tending to raise or lower the rear of the tractor in response to changing loads applied to the wheels and the rear hitch.

What is needed, however, is a steering arrangement permits the rear wheels of the tractor to be steered with respect to the chassis. What is also needed is a tractor that has the benefits provided by the suspension arm and the planetary gear system of resisting suspension compression due to changing hitch loads and wheel loads. What is also needed is a system for steering the planetary gear system on each suspension arm.

It is an object of this invention to provide a tractor and tractor suspension that has these benefits.

SUMMARY OF THE INVENTION in accordance with the first aspect of the invention, a tractor is provided, including: a chassis comprising a front end, a rear end, a left side and a right side; an engine mounted on the chassis; a pair of steerable front wheels coupled to the front end, left and right side of the chassis; a left rear suspension including a left rear suspension arm pivotally coupled to the chassis at a leading end of the suspension arm, and a first steerable planetary gear system mounted on a trailing end of the suspension arm; a right rear suspension including a right rear suspension arm pivotally coupled to the chassis at a leading end of the suspension arm, and a second steerable planetary gear system mounted on a trailing end of the right suspension arm; and left and right rear wheels driven by the first and second planetary gear systems.

The tractor may include left and right axles extending from first and second planetary gear systems, respectively, where the left and right rear wheels are mounted to the left and right axles, and where the left and right wheels are at least 2 meters in diameter. The rear end of the tractor chassis may support a differential in the differential housing, and the differential housing may support left and right drive shafts on bearings for rotation. Each of the first and second planetary gear systems may include: a first housing section bolted to an associated suspension arm; a second housing section pivotally coupled to the first housing section to pivot about a substantially vertical axis; and a third housing section rotatably supported on the second housing section and enclosing a planetary gear train. The third housing section may support three planet gears of the planetary gear train, and one of the axles may be fixed to the third housing section to rotate therewith. The tractor may include an upper pivot joint and a lower pivot joint coupling a first housing section fixed to an associated suspension arm to a second housing section, each of the upper and lower pivot joints may include a cup shaped socket configured to support a cup shaped pin. The tractor may also include a ring gear carrier coupled to the second housing section to pivot with respect to the chassis of the tractor, but not to rotate.

In accordance with a second aspect of the invention of a rear suspension for a tractor with a chassis is provided, the suspension including: a rear suspension arm pivotally coupled to the chassis at a leading end of the suspension arm; a first steerable planetary gear system mounted on a trailing end of the suspension arm; an axle extending from a housing of the planetary gear system; and a large rear wheel coupled to the axle.

The rear wheel may be at least 2 meters in diameter. The planetary gear system may be driven by a drive shaft extending from an adjacent differential in a differential housing. The planetary gear system may also include a first cylindrical housing section bolted to an associated suspension arm; a second cylindrical housing section coupled to the first housing section to pivot about a substantially vertical axis, where the second housing section supports a sun gear on a bearing for rotation; and a third cylindrical housing section rotatably supported on the second housing section and enclosing a planetary gear train. The third housing section may support three planet gears of the planetary gear train for rotation, and the axle may be fixed to the third housing section to rotate therewith. The suspension may include an upper pivot joint and a lower pivot joint coupling a first housing section fixed to an associated suspension arm to a second housing section, each of the upper and lower pivot joints also including a cup shaped socket configured to support a cup shaped pin. The suspension may also include a ring gear fixed to the second housing section to pivot with respect to the chassis of the tractor, but not to rotate with respect to the chassis of the tractor.

In accordance with a third aspect of the invention, a steerable planetary gear system for an agricultural tractor is provided, including a planetary gear set including a sun gear, a ring gear, and a plurality of planet gears; a first housing section configured to be mounted to the tractor, the first housing being generally cylindrical in shaped and configured to enclose a drive shaft; a second housing section pivotally coupled to the first housing, where the second housing is configured to support a sun gear of the planetary gear set for rotation with respect to the second housing section, the second housing section also configured to support a ring gear of the planetary gear system; and a third housing section supported for rotation on the second housing, the third housing section including an axle extending therefrom.

The system may also include a pivot joint coupling the first housing section and the second housing section, and the pivot joint coupling may include an upper pivot joint and the lower pivot joint, and each of the pivot joints may include a pin and a socket. The pins may have a cup-shaped body and a flange that is fixed to and extends from the body, and the second housing section may be configured to receive and support the upper and lower pins. The third housing section may also include a cylindrical portion with an open end, and an axle mount, where the axle mount may be fixed to and may enclose the open end, and where the axle mount may be arranged to support the axle, which extends therefrom, and the first housing section may also include a flange at one end to mount the planetary gear system to the tractor, a conical section coupled to and extending from the flange, a generally cylindrical transition section coupled to and extending from the conical section, and a steering knuckle section coupled to and extending from the transition section. The third housing section may support the plurality of planet gears for rotation.

Numerous other features and advantages of the present invention will become readily apparent from the following detailed description, the accompanying drawings, and the appended claims.

DETAILED DESCRIPTION OF THE PREFERRED EMBODIMENTS

While the present invention is susceptible of being made in any of several different forms, the drawings show a particularly preferred form of the invention. One should understand, however, that this is just one of many ways the invention can be made. Nor should any particular feature of the illustrated embodiment be considered a part of the invention, unless that feature is explicitly mentioned in the claims. In the drawings, like reference numerals refer to like parts throughout the several views.

Figure 1:
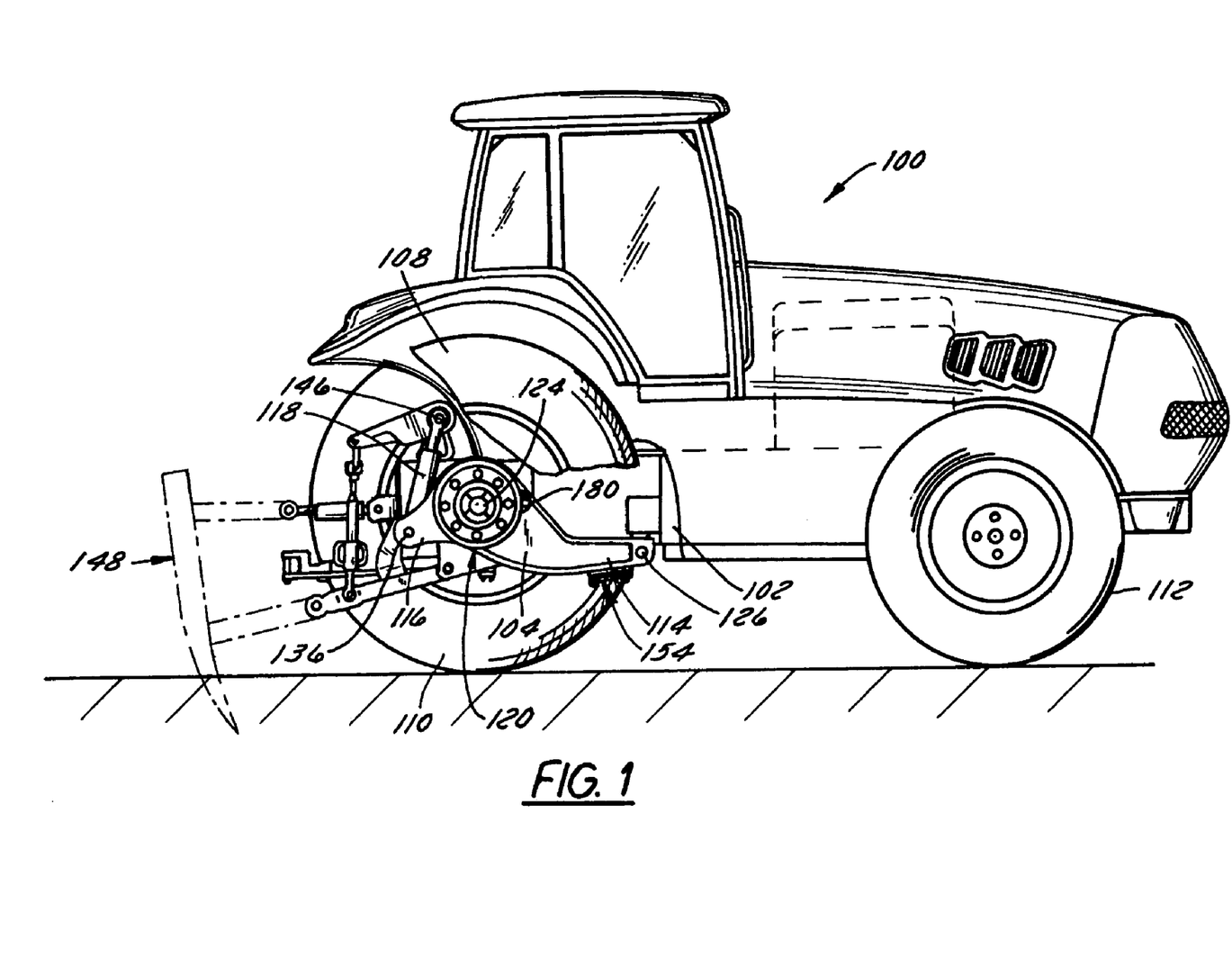
FIG. 1 is a side view of a tractor in accordance with the present invention.
Figure 2:
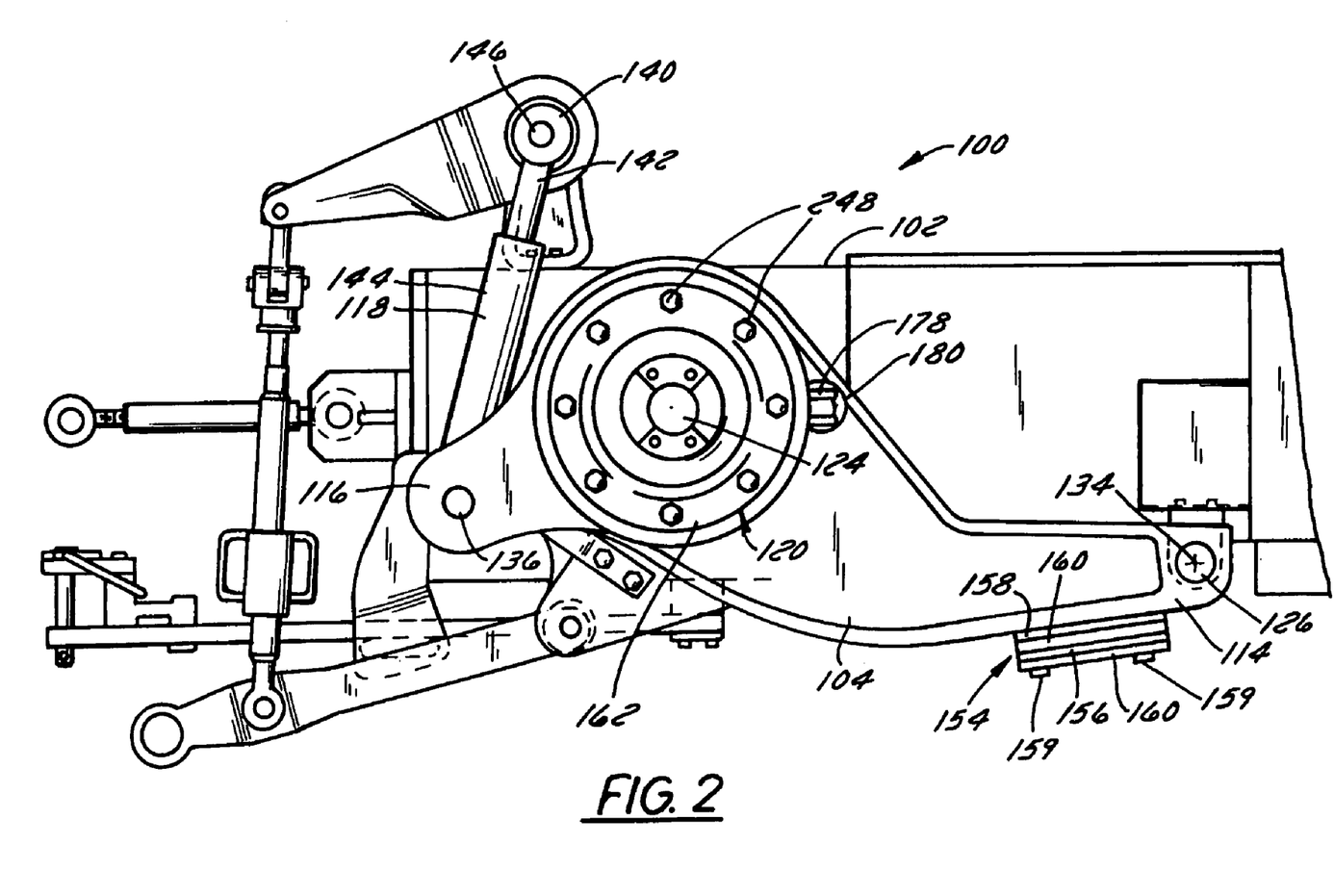
FIG. 2 is a fragmentary side view of the tractor of FIG. 1, showing the chassis and right rear suspension in greater detail.
Figure 3:
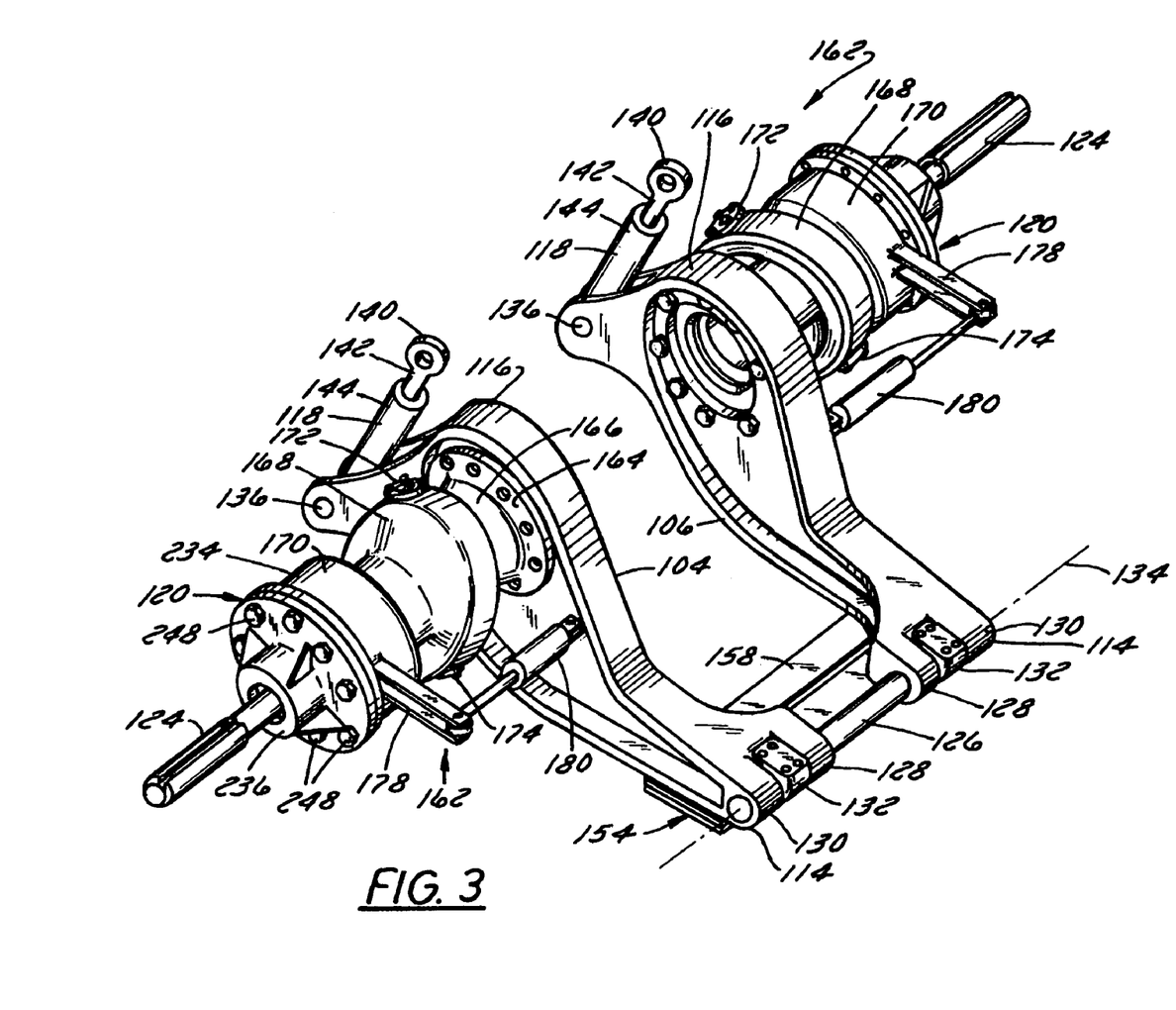
FIG. 3 is a perspective view of the left and right suspension arms, springs, anti-sway linkage and pivot pin of the tractor of the foregoing FIGURES.

FIGS. 1, 2 and 3 show a tractor 100 having a chassis 102 to which right and left suspension arms 104, 106 (FIG. 3) are coupled. Rear wheels 108, 110 are mounted to axles 124 extending from suspension arms 104, 106 and support the tractor for movement over the ground. The axles extend laterally, or side to side, with respect to the tractor. The wheels (including tires) preferably have a diameter of at least 1.5 meters, more preferably at least 2 meters, and even more preferably at least 2.5 meters. They may be fixed to axles 124 at several positions along the length of the axle including positions at least 0.25, 0.5, 1.0, and 1.5 meters or more away from the suspension arm. This is quite unlike automobiles or trucks, in which wheels of 0.3 meter diameter are mounted on axles that extend perhaps 0.2 meters from a suspension arm. Two front wheels 112 (only one shown) are coupled to the front portion of the chassis on opposite sides of the front end to support the front of the vehicle.

Referring in particular to FIG. 3, each suspension arm 104, 106 has a front end 114 and a rear end 116. The suspension arms are oriented generally fore-and-aft and extend longitudinally along the side of the tractor. The suspension arms are trailing links. The front end 114 is pivotally coupled to the chassis and the rear end 116 is supported by a spring 118. Spring 118 in the preferred embodiment shown here is a hydraulic cylinder that is coupled to a hydraulic circuit including valves and a gas-charged hydraulic accumulator (circuit not shown) to keep the spring 118 extended the appropriate amount.

Hydraulic cylinder assembly 142, 144 in the preferred embodiment shown here is coupled to a gas-charged hydraulic accumulator (not shown). As the tractor is loaded and unloaded, the hydraulic cylinders coupled to the accumulator (or accumulators) act as springs. When the load increases on the rear of the tractor, the suspension arms push upward on the cylinder portion 144 of cylinders assembly 142, 144. This increases the hydraulic pressure in the cylinder and ejects hydraulic fluid into the gas-charged accumulator. This additional hydraulic fluid in the accumulator causes the pressure in the accumulator and the cylinder to increase until the cylinder pressure is just able to counteract the increased force acting on the swing arm.

When the load is decreased on the rear of the tractor, the reverse is true. Cylinder assemblies 142, 144 gradually extend, pivoting the rear of suspension arms 104, 106 downward, permitting hydraulic fluid to escape the accumulator (or accumulators), and permitting the pressure inside the cylinders to decrease until it just balances the reduced load applied to swing arms.

Each suspension arm has an associated planetary gear system 120, which is fixed to the rear end 116 of each suspension arm. The planetary gear system 120 supports the axle 124 that extends from the gear system. The left and right rear wheels 108, 110 are mounted to left and right axles 124.

The front end 114 of each suspension arm 104, 106 is preferably coupled to chassis 102 by a pin 126. Pin 126 extends through an inner eye member 130 and an outer eye member 128 formed in the front end 114 of the suspension arm. Pin 126 also extends through an eye member 132 (FIG. 3) that is fixed to chassis 102 and fits between the inner and outer eye members 128, 130 on the suspension arms 104, 106. Pin 126, eye members 128, 130 and eye member 132 are closely toleranced, such that suspension arms 104, 106 are constrained by pin 126 to rotate about a laterally extending axis 134 best seen in FIG. 3. This arrangement also constrains the rear ends 116 of the two suspension arms to pivot about axis 134 and (in general) to move only up and down with respect to the chassis 102.

Referring to FIG. 2, each spring 118 is coupled at its lower end to its associated suspension arm by a pivot pin 136 that extends through the suspension arm and through an eye formed in the lower end of the spring 118. This arrangement permits the lower end of the spring 118 to pivot with respect to the suspension arm. A similar eye 140 is formed in the upper end of rod 142 extending from the hydraulic cylinder body 144 which is similarly pivotally coupled to a pin 146. Pin 146 is fixed to chassis 102 preferably via the tractor's rockshaft. However, the rod 142 may be coupled to the chassis at other locations.

The suspension arms pivot freely with respect to the chassis 102 with only two limits to their movement: the springs 118 and inter-arm, or anti-sway, link 154. As shown in FIG. 3, link 154 is coupled to and extends between both of the suspension arms 104, 106. The anti-sway link 154 is essentially an anti-roll bar providing a passive, anti-roll function. The anti-sway link 154 can be used alone or in conjunction with other anti-roll features, such as active control of hydraulic springs 118. Such active anti-roll will be discussed in more detail below.

The anti-sway link 154 operates in the following way. When one wheel goes over a bump causing its suspension arm to pivot upward, the pivoting suspension arm flexes one end of link 154. The other end of link 154 is connected to the other suspension arm and reacts to this movement by attempting to pivot the other suspension arm upward to the exact same degree that the first suspension arm pivoted. The second suspension arm, however, is resting on ground (via the axle and wheel) at a slightly different height and is held against the ground by its own spring 118. Spring 118 of the second suspension arm resists the upward movement of the second suspension arm by link 154, preventing link 154 from moving the second suspension arm into a perfectly parallel relationship with the first suspension arm. As a result, both suspension arms do not move together to the same (i.e. parallel) positions, and the link 154 twists. The link thereby acts as a torsional spring to resist rolling motion by the tractor.

The link's ability to twist is due to its construction. As shown in FIG. 2, link 154 is formed as two parallel plates of steel 156, 158 that are spaced apart by spacers 160. Bolts 159 (FIG. 2) are inserted into holes in the ends of the plates and the spacers. These bolts are inserted into threaded holes in the suspension arms 104, 106 and tightened. Bolts 159 are located on each end of link 154 to secure left and right ends of link 154 to the left and right suspension arms, respectively.

Besides using the anti-sway links 154 as a passive anti-roll mechanism, the springs 118 can be actively controlled to provide additional anti-roll. For example, if the right rear wheel rides over a bump while the left rear wheel descends into a dip, the spring 118 on the right can be retracted by appropriate hydraulic control and the spring 118 on the left can be extended to maintain the tractor level.

The discussion below relates to the right side suspension arm 104 and its components. The left side suspension arm 106 is identically disposed and configured as the right side suspension arm, but in mirror image form and on the opposite side of the vehicle as the left side suspension arm. Since the two are identical in construction and operation, we do not separately discuss the left side suspension arm.

Each of the planetary gear systems 120 has a housing 162 that surrounds the planetary gears of the planetary gear systems, that supports the axles 124 extending from the planetary gear systems and that provides a flange 164 that is bolted to the suspension arms 104, 106. These housings are not formed from one solid casting. Instead, they come in three sections: a first housing section 166 that is bolted to the suspension arm and is fixed with respect to the suspension arm; a second housing section 168 that is pivotally coupled to the first section 166 and extends outward therefrom; and a third housing section 170 that surrounds the planetary gears. The third housing section 170 is supported for rotation on second section 168 on bearings that are disposed between the third section and the second section. Axle 124 is fixed rigidly to the outermost end of third section 170 and extends outward therefrom. The tractor's rear wheels, not shown, are fixed to axle 124 for rotation therewith.

Two pivot pins 172, 174 are fixed to the second housing section and extend inward, through holes in the second housing section and terminate in pockets in the first housing section. These pins define a pivotal axis 176 that extends generally vertically through the center of the first and second housing sections where they overlap.

A steering member 178 extends forward from the second housing sections of each of the planetary gear systems 120. A steering cylinder 180 is pivotally coupled to and between the end of steering member 178 and the suspension arm 104, 106. When the steering cylinder 180 extends, it pushes steering member 178 outward away from the chassis of the vehicle. This causes the front portion of second housing section 168 and third housing section 170 to turn outward and away from the vehicle, pivoting about axis 176.

In order to turn both rear wheels to the left with respect to the chassis, steering cylinder 180 on the left side of the vehicle (which is coupled to left suspension arm 106) extends, pivoting the left side planetary gear system 120 counterclockwise (as viewed from the top) with respect to first section 166. Steering cylinder 180 on the right side of the vehicle (which is coupled to right suspension arm 104) retracts, pivoting the right side planetary gear system 120 counterclockwise (as viewed from the top) with respect to first section 166.

To turn both rear wheels to the right with respect to the chassis, the cylinders removed in the reverse direction. Steering cylinder 180 on the left side of the vehicle retracts pivoting the left side planetary gear system 120 clockwise with respect to first section 166, and steering cylinder 180 on the right side of the vehicle (which is coupled to right suspension arm one over four) extends, pivoting the right side planetary gear system 120 clockwise (as viewed from the top) with respect to first section 166.

Figure 4:
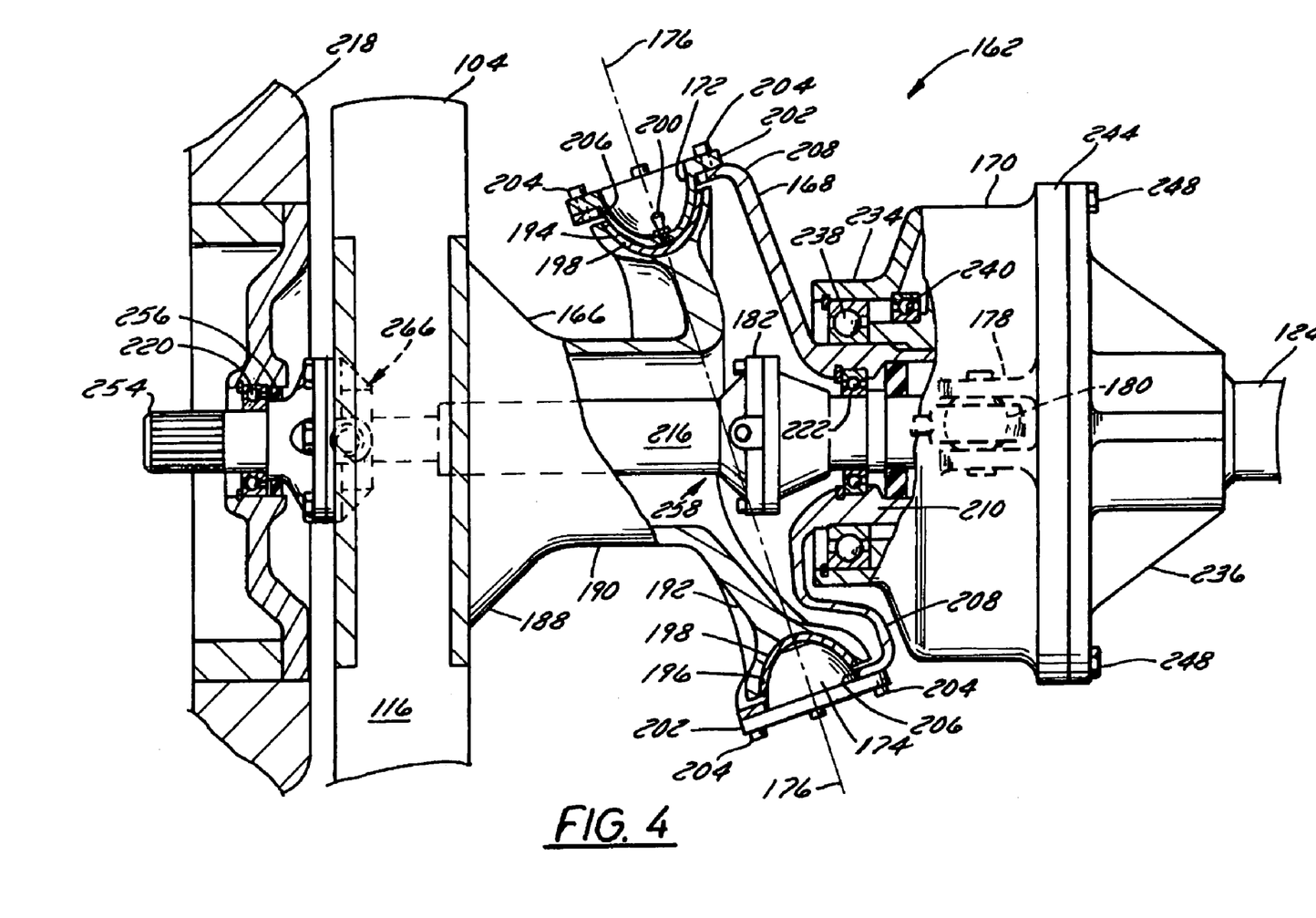
FIG. 4 is a partial cutaway rear view of the left side planetary gear system showing the internal drive shaft and the pivot joints. In this figure, the swing arm and the steerable portion of the planetary gear system are positioned such that the drive shaft is absolutely straight, and hence the axle, the sun gear, and the drive shaft, all have a common longitudinal axis.
Figure 5:
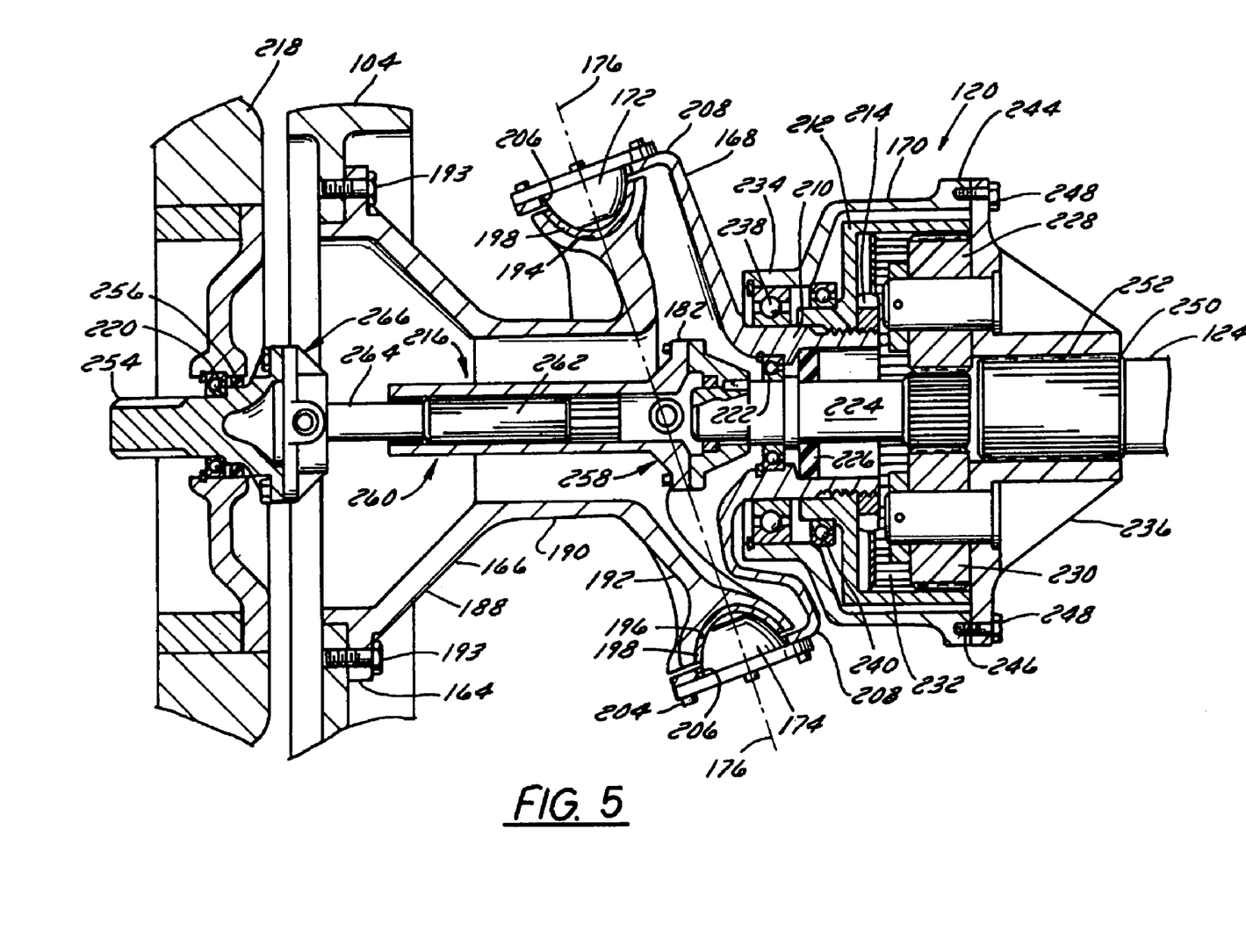
FIG. 5 is a cross-sectional view of the left side planetary gear system cylinder in the same position shown in FIG. 4, but taken through the longitudinal central axis of the planetary gear system. In this figure, as in FIG. 4, the swing arm and the steerable portion of the planetary gear system are all positioned such that the drive shaft is absolutely straight, and hence the axle, the sun gear, and the drive shaft, all have a common longitudinal axis.

FIGS. 4 and 5 are rear views of the right side suspension arm 104 together with the right side planetary gear system 120.

In FIG. 4, a portion of the first, second, and third housing sections 166, 168, 170 have been cut away to show the pivot pins 172, 174 and flexible coupling 182 (preferably a constant velocity joint or universal joint) that is disposed in driveshaft 216 and permits second and third sections 168, 172 pivot with respect to first section 166.

In FIG. 5, the entire planetary gear system has been sectioned down the central axis of system 120 to illustrate the bearings and the internal complements of the planetary gear assembly itself.

The left side planetary gear system is identical to that shown in FIG. 4 but in perfect mirror relation. For that reason, we do not show it or describe it separately herein. All the statements made herein regarding the left side planetary gear system apply in equal force to the less side planetary gear system and the left side suspension arm 106.

Referring now to FIGS. 4-5, first housing section 166 includes flange 164, a conical section 188, a transition section 190, and a steering knuckle section 192. Flange 164 extends radially outward from the large end of conical section 188, which abuts suspension arm 104. Bolts 193 pass through holes in flange 164 and are threaded into suspension arm 104. Transition section 190 is generally cylindrical and is formed integral with the narrow end of conical section 188. Transition section 190 extends rightwardly (in the FIGURES) to its rightmost end, where it terminates and is formed integral with steering knuckle section 192.

Steering knuckle section 192 is generally elliptical in longitudinal cross-section (see, for example, FIG. 3), and defines a first upper pivot socket 194 and a second lower pivot socket 196. These two sockets 194, 196 are configured to receive and support pivot pins 172, 174, respectively.

First housing section 166 provides a way of removably fixing the planetary gear system 120 to the suspension arm. It also provides support for pivot pins 172, 174. The length of first housing section 166 also help space pivotal axis 176 laterally away from the side of the tractor, spacing the rear wheels farther from the tractor chassis and providing thereby additional clearance between the inside edge of the tractor tires and the tractor chassis. Since the rear tractor tires typically have a diameter of 1.8-2.2 meters, they extend a 1.0-2.0 meters forward of axle 124. If the wheels were located directly next to the chassis of the tractor, steering them only a few degrees toward the chassis would cause them to interfere with the tractor chassis. The length of first housing section 166, increases the distance between the rear wheels and the tractor chassis.

Transition section 190 of first section 166 is smaller in diameter than conical section 188 and steering knuckle section 192. This smaller diameter provides clearance for second housing section 168 when section 168 is pivoted forward or backward with respect to first section 166.

Steering knuckle section 192 is large enough to space upper and lower pivot sockets 194, 196 a sufficient distance apart to resist the bending moments applied to them by pivot pins 172, 174. In a typical tractor, pivot sockets 194, 196 will preferably be spaced a distance of 0.3 to 0.5 meters apart. The diameter of the sockets will typically be 50 to 100 mm in diameter and 50 to 100 mm in depth.

First housing section 166 is preferably cast-iron or cast steel. Sockets 194, 196 preferably have a steel lining or steel and antifriction lining to reduce wear. In the embodiment shown in FIG. 4, each socket has an associated cup shaped antifriction lining 198 that is removably fixed to each socket. Suitable materials can include steels or cast irons, preferably with the surface microstructure that will retain high-pressure lubricants such as graphite-or molybdenum disulfide-based lubricants. Alternatively, (or in addition to) these lubricants and materials, antifriction lining 198 can include a layer of ultrahigh molecular weight polyethylene or polypropylene, or a fluoropolymer such as polytetrafluoroethylene (PTFE). As shown in FIG. 4, a lubricant fitting 200 can be fixed to pivot pins 172, 174 (or in the alternative, directly to sockets 194, 196) to inject lubricants directly between pivot pins 172, 174 and sockets 194, 196, respectively.

Pivot pins 172, 174 and sockets 194, 196 are preferably cup shaped. With this arrangement, the pivot joints defined by the pins and sockets can be made rigid, and pivot joint play reduced or eliminated, by varying the axial preload on pivot pins 172, 174. Since the pins are tapered, all slack in the two joints can be removed by forcing the two pins closer together. This allows for reasonable manufacturing tolerances as well as a reasonable amount of wear before either the pins themselves or the sockets need to be replaced or remanufactured.

Pins 172, 174 have a flange 202 that extends radially outward from the longitudinal axis 176 of the pins and sockets. Flange 202 has four holes spaced equiangularly about the circumference of the flange that extend through the flange in up direction parallel to the longitudinal axis of the pins. Bolts 204 are inserted into these holes and are threadedly engaged to second housing section 168. The preload on the pivot joints defined by the pins and sockets can be varied by inserting shims of different thicknesses between flange 202 and second section 168. The thicker the shims, the looser the joints. The thinner the shims, the tighter the joints.

Pins 172, 174 are disposed in circular holes 206 in steering knuckle portion 208 of second housing section 168. They are secured to steering knuckle portion 208 with bolts 204, discussed above. Steering knuckle portion 208, like steering knuckle portion 192, is generally elliptical in longitudinal cross-section with its major axis oriented vertically in its minor axis oriented horizontally and fore-and-aft. Second housing section 168 (as from FIG. 5) transitions from steering knuckle portion 208 to cylindrical portion 210 which extends laterally outward and away from suspension arm 104. Cylindrical portion 210 has a splined outer surface at its rightmost end. These splines mate with ring gear support 212 which slides over the outer surface of cylindrical portion 210. A nut 214 is threadedly engaged to external threads on the outer surface of cylindrical portion 210. When nut 214 is tightened, it presses against ring gear support 212 and secures it to the rightmost end of cylindrical portion 210. The splines prevent ring gear support 212 from rotating with respect to cylindrical portion 210. Thus, ring gear support 212 is fixed with respect to second section 168 and also fixed to pivot about axis 176 with respect to swing arm 104.

Cylindrical portion 210 is hollow and supports the right end of drive shaft 216. Drive shaft 216 extends from differential housing 218, into and through cylindrical portion 210.

Differential housing 218 supports the left end of drive shaft 216 in bearing 220 for relative rotation with respect to differential housing 218. Bearing 220 is fixed in differential casing 218.

Cylindrical portion 210 supports the right end of drive shaft 216 for relative rotation in bearing 222. The right end of drive shaft 216 is fixed in the center of cylindrical portion 210.

A sun gear 224 is fixed to the right end of drive shaft 216. A seal 226 is coupled to and between the shaft of sun gear 224 and cylindrical portion 210 to prevent the leakage of lubricant from around the planetary gears. Bearing 222 also supports the end of the sun gear 224, permitting sun gear 224 to rotate with respect to the cylindrical portion and to drive the three planet gears.

Sun gear 224 drives three planetary gears (only two, 228, 230 are shown in the FIGURES) that, in turn, engage ring gear 232. Ring gear 232 is formed on, or fixed to, an inner surface of ring gear support 212.

Third housing section 170 includes two components: an outer cylindrical portion 234 that is supported for rotation on cylindrical portion 210 of second housing section 168, and ring gear support 212; and an axle mount 236 that is bolted to the distal end of cylindrical portion 234 enclosing the distal end of cylindrical portion 234.

Cylindrical portion 234 is supported for rotation on bearings 238, 240, which are disposed on the outer surface of cylindrical portion 210 and ring gear support 212 and support the inner surface of cylindrical portion 234. A seal (not shown) is provided that is coupled to and extends between the inner surface of cylindrical portion 234 and the outer surface of cylindrical portion 210 to prevent the leakage of planetary gear lubricant.

Cylindrical portion 234 has a flange 244 at its distal end that has several threaded holes 246. Axle mount 236 abuts flange 244 and is fixed thereto by bolts 248. Bolts 248 extend through holes in axle mount 236 and are threadedly engaged to holes 246 in cylindrical portion 234. When bolts 248 are tightened, cylindrical portion 234 and axle mount 236 are rigidly fixed to one another. Axle 124 preferably has a keyed or splined outer surface 250 that is forced it into a grooved cylindrical hole 252 in axle mount 236, although other arrangements for coupling axle 124 to axle mount 236, such as bolts, pins, or adhesives, are contemplated. Thus, axle 124, axle mount 236, and cylindrical portion 234 together form a rigid structure that is mounted for rotation on bearings 238 and 240. Axle 124 is sufficiently long to support one or two rear wheels. Bearings 238 and 240 must therefore be capable of handling a significant overhanging load. They are preferably spaced and axial distance of at least 100 mm apart.

Drive shaft 216 permits suspension arm 104 to travel or move up and down with respect to differential housing 218. It does this by increasing and decreasing in length as suspension arm 104 pivots, and by flexing at its two flexible couplings to permit axial misalignment of the sun gear 224 and the end 254 of drive shaft 216 supported in differential housing 218. End 254 of drive shaft 216 is supported for rotation in differential housing 218 by bearing 220. A seal 256 is also disposed between the differential housing and end 254 to prevent lubricant from leaking out of differential housing 218.

Differential gears (not shown, but of conventional construction) are coupled to end 254 of drive shaft 216 to drive it in rotation. The other end 258 of drive shaft 216 is coupled to sun gear 224 to drive the sun gear in rotation. A central portion 260 of drive shaft 216 includes a hollow internally keyed or grooved portion 262 that is slidingly engaged to an externally keyed or grooved portion 264.

End 254, central portion 260, and end 258 are coupled together with flexible couplings 266 (preferably a universal joint or constant velocity joint) and 182. These two couplings permit the relative movement (up and down) of one end of drive shaft 216 with respect to the other end. The splined central portion also permits the relative movement (in and out) of one end of drive shaft 216 with respect to the other end. Relative movement in both directions is necessary to permit suspension arm 104 to pivot with respect to differential housing 218.

From the foregoing detailed description of the preferred embodiments, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

I claim:

1. A tractor, comprising;
a chassis comprising a front end, a rear end, a left side and a right side;
an engine mounted on the chassis;
a pair of steerable front wheels coupled to the front end, left and right side of the chassis;
a left rear suspension including a left rear suspension arm pivotally coupled to the chassis at a leading end of the suspension arm, and a first steerable planetary gear system mounted on a trailing end of the suspension arm;
a right rear suspension including a right rear suspension arm pivotally coupled to the chassis at a leading end of the suspension arm, and a second steerable planetary gear system mounted on a trailing end of the right suspension arm; and
left and right rear wheels driven by the first and second planetary gear systems;
wherein each of the first and second planetary gear systems further comprises:
a first housing section bolted to an associated suspension arm;
a second housing section pivotally coupled to the first housing section to pivot about a substantially vertical axis; and
a third housing section rotatably supported on the second housing section and enclosing a planetary gear train; and
further wherein the third housing section supports three planet gears of the planetary gear train, and further wherein one of the axles is fixed to the third housing section to rotate therewith.

2. A tractor, comprising;
a chassis comprising a front end, a rear end, a left side and a right side;
an engine mounted on the chassis;
a pair of steerable front wheels coupled to the front end, left and right side of the chassis;
a left rear suspension including a left rear suspension arm pivotally coupled to the chassis at a leading end of the suspension arm, and a first steerable planetary gear system mounted on a trailing end of the suspension arm;
a right rear suspension including a right gear suspension arm pivotally coupled to the chassis at a leading end of the suspension arm, and a second steerable planetary gear system mounted on a trailing end of the right suspension arm;
left and right rear wheels driven by the first and second planetary gear systems; and
an upper pivot joint and a lower pivot joint coupling a first housing section fixed to an associated suspension arm to a second housing section, each of the upper and lower pivot joints further comprising a cup shaped socket configured to support a cup shaped pin.

3. The tractor of claim 2, further comprising a ring gear carrier coupled to the second housing section to pivot therewith with respect to the chassis of the tractor, not to rotate.

4. A rear suspension for a tractor with a chassis, the suspension comprising;
a rear suspension arm pivotally coupled to the chassis at a leading end of the suspension arm;
a first steerable planetary gear system mounted on a trailing end of the suspension arm; and
an axle extending from a housing of the planetary rear system; and
a large rear wheel coupled to the axle;
wherein the planetary gear system further comprises:
a first cylindrical housing section bolted to an associated suspension arm;
a second cylindrical housing section coupled to the first housing section to pivot about a substantially vertical axis, the second housing section supported a sun gear on a bearing for rotation; and
a third cylindrical housing section rotatably supported on the second housing section and enclosing a planetary gear train;

wherein the third housing section supports three planet gears of the planetary gear train for rotation, and further wherein the axle is fixed to the third housing section to rotate therewith.

5. A rear suspension for a tractor with a chassis, the suspension comprising:
   a rear suspension arm pivotally coupled to the chassis at a leading end of the suspension arm;
   a first steerable plaretary gear system mounted on a trailing end of the suspension arm; and
   an axle extending from a housing of the planetary gear system;
   a large rear wheel coupled to the axle; and
   further comprising an upper pivot joint and a lower pivot joint coupling a first housing section fixed to an associated suspension arm to a second housing section, each of the upper and lower pivot joints further comprising a cup shaped socket configured to support a cup shaped pin.

6. The rear suspension of claim 5, further comprising a ring gear fixed to the second housing section to pivot therewith with respect to the chassis of the tractor.

7. A steerable planetary gear system for an agricultural tractor, comprising:
   a planetary gear set including a sun gear, a ring gear, and a plurality of planet gears;
   a first housing section configured to be mounted to the tractor, the first housing being generally cylindrical in shaped and configured to enclose a drive shaft;
   a second housing section pivotally coupled to the first housing, the second housing being further configured to suppport a sun gear of the planetary gear set for rotation with respect to the second housing section, the second housing section also being configured to support a ring gear of the planetary gear system;
   a third housing section supported for rotation on the second housing, the third housing section including axle extending therefrom; and
   a pivot joint coupling the first housing section and the second housing section, wherein the pivot joint coupling includes an upper pivot joint and the lower pivot joint, each of the pivot joints further comprising a pin and a socket.

8. The system of claim 7, wherein the pins have a cup-shaped body and a flange that is fixed to and extends from the body, and further wherein the second housing section is configured to receive and support the upper and lower pins.

9. A steerable planetary gear system for an agricultural tractor, comprising:
   a planetary gear set including a sun gear, and a plurality of planet gears;
   a first housing section configured to be mounted to the tractor, the first housing being generally cylindrical in shaped and configured to enclose a drive shaft;
   a second housing section pivotally coupled to the first housing, the second housing being further configured to support a sun gear of the planetary gear set for rotation with respect to the second housing section, the second housing section also being configured to support a ring gear of the planetary gear system; and
   a third housing section supported for rotation on the second housing, the third housing section including an axle extending therefrom;
   wherein the first housing section further comprises:
   a flange at one end to mount the planetary gear system to the tractor,
   a conical section coupled to and extending from the flange,
   a generally cylindrical transition section coupled to and extending from the conical section, and
   a steering knuckle section coupled to and extending from the transition section.

10. A steerable planetary gear system for an agricultural tractor, comprising:
    a planetary gear set including a sun gear, a ring gear, and a plurality of planet gears;
    a first housing section configured to be mounted to the tractor, the first housing being generally cylindrical in shaped and configured to enclose a drive shaft;
    a second housing section pivotally coupled to the first housing, the second housing being further configured to support a sun gear of the planetary gear set for rotation with respect to the second housing section, the second housing section also being configured to support a ring gear of the planetary gear system; and
    a third housing section supported for rotation on the second housing, the third housing section including an axle extending therefrom;
    wherein the third housing section supports the plurality of planet gears for rotation.

* * * * *